Nov. 20, 1923.　　　　　　　　　　　　　　　　1,474,623
A. R. CLAS
SPOTLIGHT ADJUSTING MEANS
Filed July 24, 1922　　　2 Sheets-Sheet 1

INVENTOR
Angelo Robert Clas,
By Owen Owen & Crampton
Attys.

Nov. 20, 1923.

A. R. CLAS 1,474,623

SPOTLIGHT ADJUSTING MEANS

Filed July 24, 1922

2 Sheets-Sheet 2

INVENTOR
Angelo Robert Clas.
By Owen Owen & Crampton
Attys.

Patented Nov. 20, 1923.

1,474,623

UNITED STATES PATENT OFFICE.

ANGELO ROBERT CLAS, OF TOLEDO, OHIO.

SPOTLIGHT-ADJUSTING MEANS.

Application filed July 24, 1922. Serial No. 577,018.

*To all whom it may concern:*

Be it known that I, ANGELO ROBERT CLAS, a citizen of the United States, and a resident of Toledo, in the county of Lucas and State of Ohio, have made an Invention Appertaining to a Spotlight-Adjusting Means; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to carrying and adjusting means for vehicle spot-lights, and has for its primary object the provision of simple and efficient means of this character which is adapted to carry a spot-light in usable position and is adjustable from within a vehicle, or from any easily accessible position, to impart universal adjustment to the spot-light.

Further objects and advantages of the invention will be apparent from the following detailed description thereof.

While the invention in its broader aspect is capable of embodiment in numerous forms, a preferred embodiment thereof is illustrated in the accompanying drawings, in which,—

Figure 1:
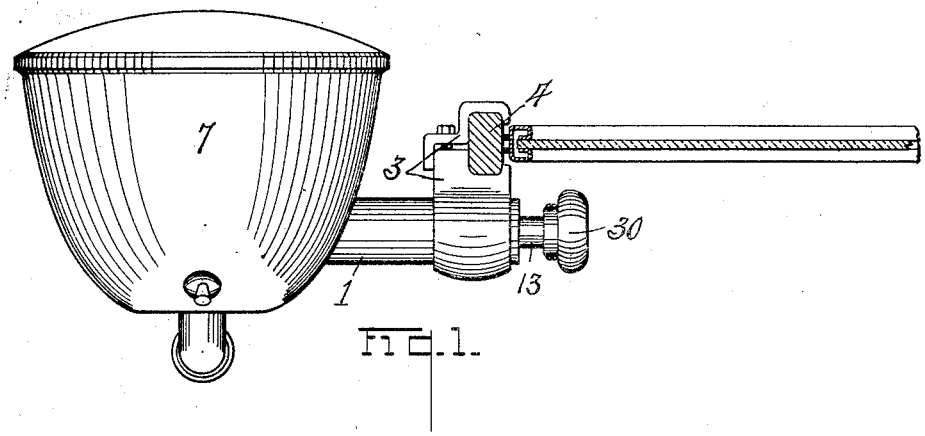
Figure 2:
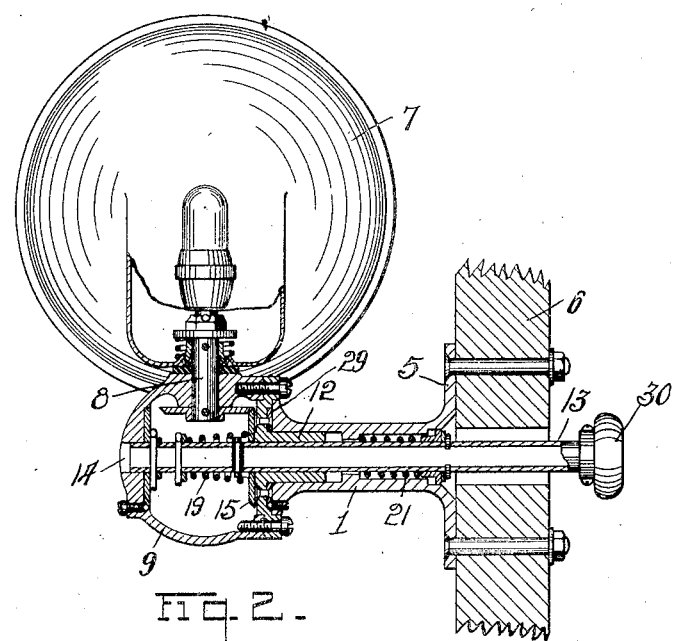
Figure 3:
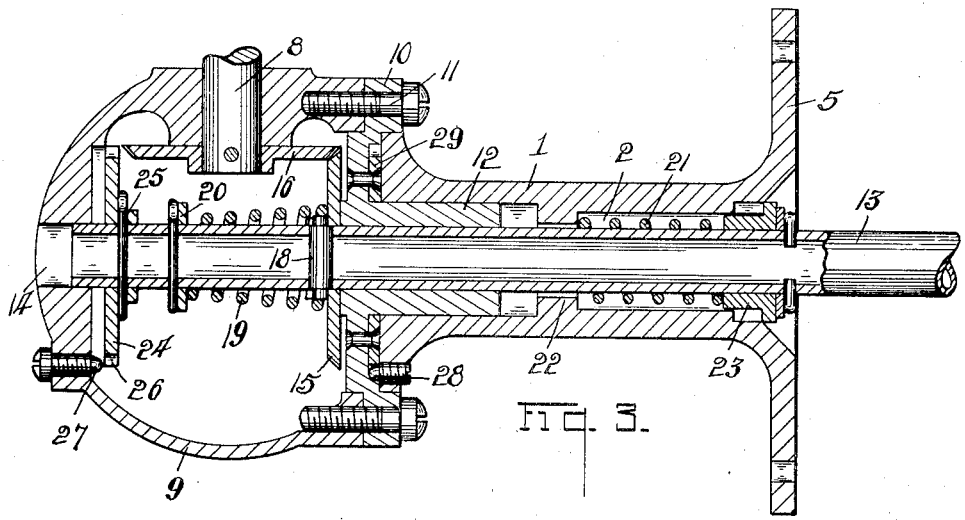
Figure 4:
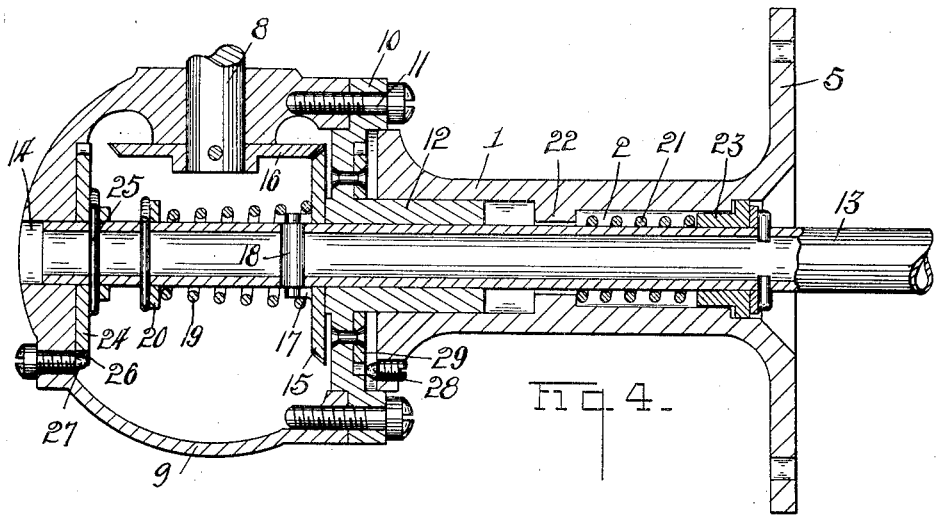
Figure 5:
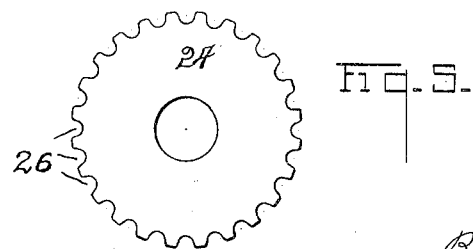

Fig. 1 is a top plan view of a spot-light and adjusting means therefor attached to a windshield frame of a vehicle, the latter being fragmentarily shown. Fig. 2 is a rear elevation thereof with parts in section and with the carrying bracket attached to a frame post or other rigid part of a closed vehicle body. Fig. 3 is an enlarged central longitudinal section of the spot-light carrying and adjusting means released for rotary movements around the axis of the spot-light carrying shaft. Fig. 4 is a similar view with the adjusting parts released to permit vertical tilting movements of a spot-light, and Fig. 5 is a plan view of one of the locking wheels of the adjusting means.

Referring to the drawings, 1 designates a bracket arm having an opening 2 extending longitudinally therethrough and shown in Fig. 1, as having a clamping means 3 at its inner end for adapting it to be clamped to a side upright member 4 of a windshield in an open vehicle, and shown in Figs. 2, 3 and 4 as having its inner end provided with a flange 5 adapted to seat against and be bolted to a side frame post or upright 6 of a closed vehicle body.

The spot-light 7 has a stem or shaft 8 projecting downward from its bottom portion at substantially a right angle to the direction of projection of light rays therefrom and this shaft is journaled at its outer end in the side of a hollow head or case 9 which is carried by the outer end of the bracket arm 1 for rotary movements about an axis at right angles to the axis of the shaft 8.

An opening is provided in the side of the head 9 adjacent the bracket 1 and this opening is closed by a plate 10 secured to the head by screws 11. A bearing sleeve 12 projects axially from the outer side of the plate 10 into the outer end of the bracket arm 1 being journaled therein for rotary movements and also for axial movements.

A control shaft 13 is projected through the bracket arm 1 from the inner end thereof, being mounted both for rotary and axial movements in the arm and has one end extending through the bearing sleeve 12 and plate 10 and into the head 9 and loosely mounted in an opening 14 provided in a side wall of the head. A beveled gear 15 is mounted on the shaft in side abutment with the plate 10 and meshes with a bevel gear 16 which is fixed to the inner end of the spot-light carrying shaft 8. The gear 15 has a hub flange projecting therefrom in opposition to the plate 10 and this flange is provided with longitudinally extending notches 17 at diametrically opposite points therein for receiving the ends of a pin 18, which extends through the shaft 13. It is thus evident that a turning of the shaft 13 relative to the head 9 will communicate a turning movement to the shaft 8 about its axis thereby causing a lateral turning of the spot-light to shift its rays transversely of the direction of movement of the associated vehicle.

A coiled compression spring 19 encircles the shaft 13 within the head 9 and bears at one end against a collar 20 on the shaft and at its other end against the gear 15 thereby normally forcing the gear against the plate 10, the gear being free for longitudinal movements on the shaft. A second coiled compression spring 21 is mounted on the shaft within the bracket arm opening 2 and has one end thrust against a bracket shoulder 22 in said opening and its other end thrust against a collar 23 on the shaft at the inner side of the shoulder, so that both the shaft and the head 9 are normally held in the relation to the bracket arm 1 shown in Fig. 2. In this connection it will be understood that the spring 19 is of slightly greater tension than the spring 21 so that the former spring will normally retain the shaft 13 at the limit of its inward or left hand movement with respect to the head 9, which movement is limited as hereinafter described, while the spring 21 acts on the shaft and through the spring 19 and gear 15 against the plate 10 to normally hold the head 9 at the limit of its inward movement with respect to the bracket arm 1.

A collar 24 is fixed to the inner end of the shaft 13 by a pin 25 and is adapted to act as a stop for coaction with the adjacent side of the head 9 to limit the inward or left hand movements of the shaft 13 with respect to the head. The collar 24 is provided with a circular series of openings or notches 26 adapted to engage with a registering lock stud 27 on the head when the shaft and plate are at the limit of their inward movements relative to the head as shown in Fig. 4. The stud 27 is carried, in the present instance, by a screw which is threaded through a side of the head. It is evident that when the collar 24 is in locking engagement with the stud 27 the shaft and head are caused to have relative turning movements together.

The head 9 is prevented from having turning movements relative to the bracket arm 1 when the head is at the limit of its inward movement relative to the bracket by reason of a lock stud 28 on the outer end of the bracket arm engaging one of a circular series of registering holes provided in the inner end portion of the head. These holes or notches in the present instance, are provided in a collar or annular plate 29 secured to the outer side of the plate 10.

It is evident that when the parts are in the normal position shown in Fig. 2 both collars 24 and 29 are in locking engagement with their respective studs 27 and 28 so that the head is locked against turning movements relative to the bracket arm 1 and the spotlight carrying shaft 8 is locked against turning movements relative to the head 9. If it is desired to impart turning movements to the shaft 8 about its axis so as to shift the spot-light rays transversely of the direction of travel the operator draws inward on the shaft 13, the outer or free end of which is disposed in accessible position within the vehicle, thereby effecting an inward withdrawal of the locking collar 24 from engagement with the stud 27 to permit a turning of the shaft 13, and the operator then turns the shaft to communicate rotation to the shaft 8 through the gears 15 and 16. If it is desired to impart a vertical tilting movement to the spot-light the operator pushes out on the shaft 13 against the tension of the spring 21 thereby causing the collar 24 in coaction with the outer side of the head 19 to force the head and its plate 10 outward from the end of the bracket arm 1 sufficient to release the locking collar 29 from engagement with the stud 28. This being done the shaft is turned to impart the desired tilting movement to the head and spot-light after which the shaft is released and caused by the action of the spring 21 to return to its normal position which permits the head 9 to move inward toward the bracket arm 1 into locking engagement with the stud 28. A control wheel or handle 30 is mounted on the shaft 13 in accessible position to facilitate movement of the shaft.

It is evident I have provided a simple and compact carrying and adjusting means for a spot-light which is operable from within a car, is adjustable to impart universal adjusting movements to the spot-light and is normally locked against adjusting movement.

I wish it understood that my invention is not limited to any specific construction, arrangement or form of the parts, as it is capable of embodiment in numerous forms without departing from the spirit of the claims.

Having thus described my invention, what I claim as new, and desire to secure by Letters Patent, is,—

1. In combination, a bracket, a head carried for rotary movements by the bracket, a shaft journaled in and projecting from the head at an angle to its turning axis, a control shaft journaled in the bracket and projecting into the head for rotary and axial movements relative thereto, driving connection between the two shafts, means exerting an outward pressure on the control shaft, means exerting an inward pressure thereon intermediate the shaft and interior part of the head, means normally locking the control shaft and head against relative rotation and releasable by a predetermined axial movement of the control shaft, means normally locking said head and bracket against relative rotation and releasable by a predetermined axial movement of the control shaft, the control shaft being rotatable to impart rotation to the first shaft when the first locking means is released and to impart rotation to the head when the second locking means is released.

2. In combination, a bracket, a head carried for rotary and axial movements by the bracket, a lamp carried by said head for rotary movements therewith and rotary movements relative thereto, means locking the head and bracket against relative rotary movements when the head is in one position of its axial movements, a control means mounted for rotary and axial movements relative to the head and normally locked against rotation relative to the head, said control means being axially movable in one direction to release the locking connection between the head and bracket and being axially movable in the opposite direction to release its locking connection with the head when the head is released from the bracket and being rotatable independently of the head when released therefrom, and means operable to impart rotation to the lamp relative to the head from the control means when the latter is rotated and released from locking engagement with the head.

3. In a spot light adjuster, a bracket, a rotary head carried by the bracket, a rotary lamp carried by the head, means to lock the head to the bracket, means to rotate the lamp, unitary control means for effecting operation of the lamp and head, means to connect the control means and head, and means to connect said control means to the connecting means and locking means and to the lamp rotating means whereby in one position of the control means the latter will be locked to the head to enable rotating of same and will release the head locking means from the bracket and in a second position of the control means the latter will cause the head to be locked to the bracket and will release the connecting means between the head and control means and will operatively connect the lamp rotating means to the control means.

4. In combination with a bracket, a rotary and axially movable shaft carried by the bracket a rotatable and slidable head on the shaft, a rotatable lamp carried by the head, a gear fixed to the lamp, a gear on the shaft in mesh with the first named gear, cooperating means on the head and bracket to lock the head against rotation, cooperating means on the head and shaft to lock the shaft to the head so as to rotate the head upon rotation of the shaft, and means to releasably lock the gear of the shaft thereto whereby upon axial movement of the shaft in one direction to lock same to the head the gear of the shaft will be released and upon axial movement of the shaft in a reverse direction the head locking means will be released and the gear of the shaft will be locked thereto.

5. In a spot light adjuster, a bracket, a rotatable and axially movable head carried by the bracket, a rotatable lamp carried by the head, means to lock the head to the bracket, a rotatable and axially movable shaft, means to lock the shaft to the head so as to turn the head upon rotation of the shaft, means to rotate the lamp from the shaft, and means to releasably connect the lamp rotating means to the shaft whereby upon axial movement of the shaft in one direction the shaft and head will be locked together and the lamp rotating means released and upon axial movement of the shaft in the reverse direction the shaft and head will be unlocked and the lamp rotating means operatively connected to the shaft.

6. In a spot light adjuster, a bracket, a rotary head carried by the bracket, a rotary lamp carried by the head, rotary and axially movable control means, releasable means to lock the head and control means together to rotate the head upon rotation of the control means, releasable means to lock the head to the bracket against rotation, and means releasably connected to the control means to rotate the lamp upon rotation of the control means and upon release of the first named releasable means and release of the locking means of the head to the bracket.

7. In a spot light adjuster, a bracket, a rotary head carried by the bracket, a rotary lamp carried by the head, a single control means to operate the head and lamp, means between the lamp and control means to rotate the lamp upon rotation of the control means, means to render said lamp rotating means operative and inoperative upon different movements of the control means, means between the bracket and head to lock the head to the bracket and to render said lamp rotating means operative upon movement of the control means in one direction and to unlock the head from the bracket and to render the lamp rotating means inoperative upon movement of the control means in a different direction, and means between the control means and head to lock the head and control means upon said movement of the control means to unlock the lamp rotating means and the head locking means.

In testimony whereof, I have hereunto signed my name to this specification.

ANGELO ROBERT CLAS.